_United States Patent_ [19]

Hesch

[11] Patent Number: 5,246,321
[45] Date of Patent: Sep. 21, 1993

[54] RAILWAY SPINE CAR

[75] Inventor: Harold E. Hesch, St. John, Ind.

[73] Assignee: Trinity Industries, Inc., Dallas, Tex.

[21] Appl. No.: 749,686

[22] Filed: Aug. 26, 1991

[51] Int. Cl.⁵ .............................................. B61D 45/00
[52] U.S. Cl. ..................................... 410/58; 410/54;
410/64; 410/56; 410/71; 410/72; 410/73;
105/416; 105/419
[58] Field of Search .............. 410/54, 56, 58, 59,
410/60, 61, 62, 63, 64, 71, 72, 73, 83; 105/416,
419

[56] References Cited

U.S. PATENT DOCUMENTS

| | | |
|---|---|---|
| 2,079,552 | 5/1937 | Fenstermacher et al. ...... 105/416 X |
| 2,103,751 | 12/1937 | Kelley ..................... 410/83 |
| 3,161,151 | 12/1964 | Johansson ................ 410/72 X |
| 3,207,086 | 9/1965 | Mowatt-Larssen et al. . |
| 3,370,550 | 2/1968 | Gutridge et al. ............ 410/54 |
| 3,507,226 | 4/1970 | Nadherny ................. 410/83 |
| 3,577,933 | 5/1971 | Ferris et al. .............. 105/416 X |
| 3,586,286 | 6/1971 | Pratt ...................... 410/83 |
| 4,339,996 | 7/1982 | Broudeur et al. ........... 105/416 X |
| 4,547,107 | 10/1985 | Krause .................... 410/58 |
| 4,825,778 | 5/1989 | Riley ..................... 410/58 X |
| 4,826,371 | 5/1989 | Brown ..................... 410/54 |
| 5,052,868 | 10/1991 | Hesch et al. .............. 410/54 |

Primary Examiner—Michael S. Huppert
Assistant Examiner—Stephen Gordon
Attorney, Agent, or Firm—Baker & Botts

[57] ABSTRACT

An improved articulated railway spine car unit for carrying highway truck trailers and/or containers has a center sill which extends substantially the entire length of the car unit. The center sill has end portions with upper surfaces depressed with respect to the upper surface of a longitudinally extended center portion. A retractable fifth wheel or trailer hitch is located on the upper surface of at least one end portion of the center sill. The upper surface of the trailer hitch, when retracted onto the center sill, is at substantially the same level as the center portion of the center sill. The raised center sill center portion both provides backup support for the floors of containers carried on the car unit, and also increases the center sill's structural rigidity and resistance to bending deflection. Stowable container locks extending through trailer wheel decks on the car unit are provided with pivotable covers which cover the locks and associated wheel deck openings when the locks are stowed, and secure the locks in their upright position when a container is to be mounted thereon.

6 Claims, 2 Drawing Sheets

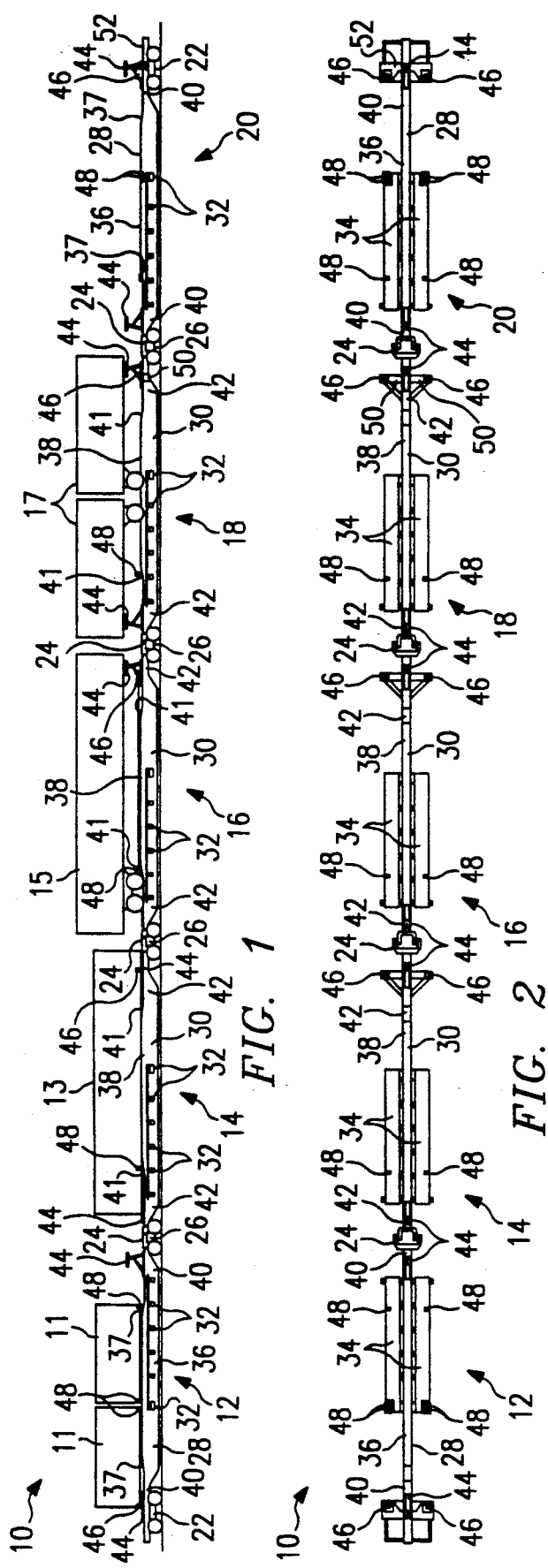
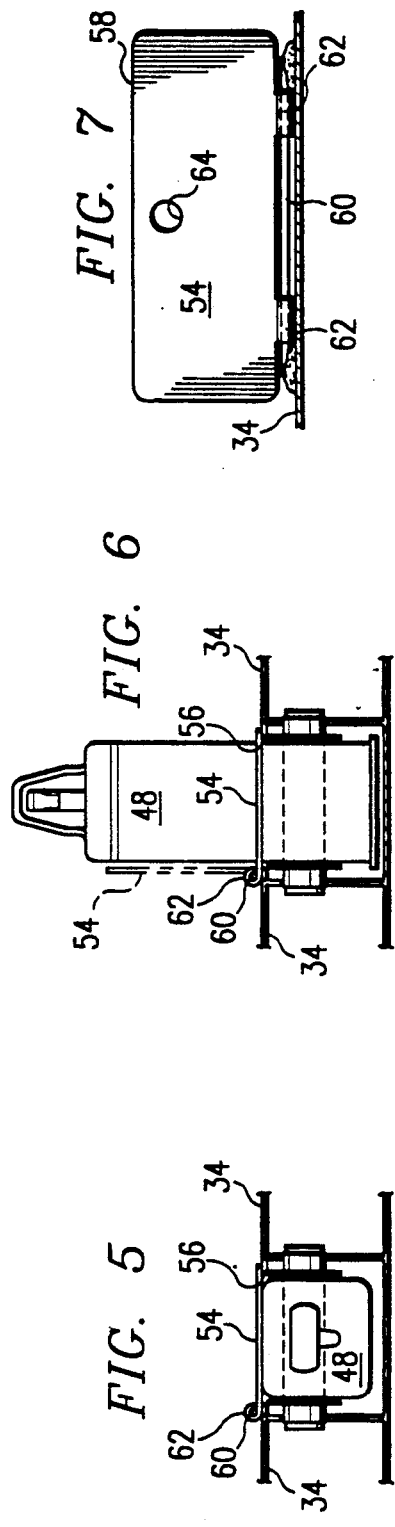

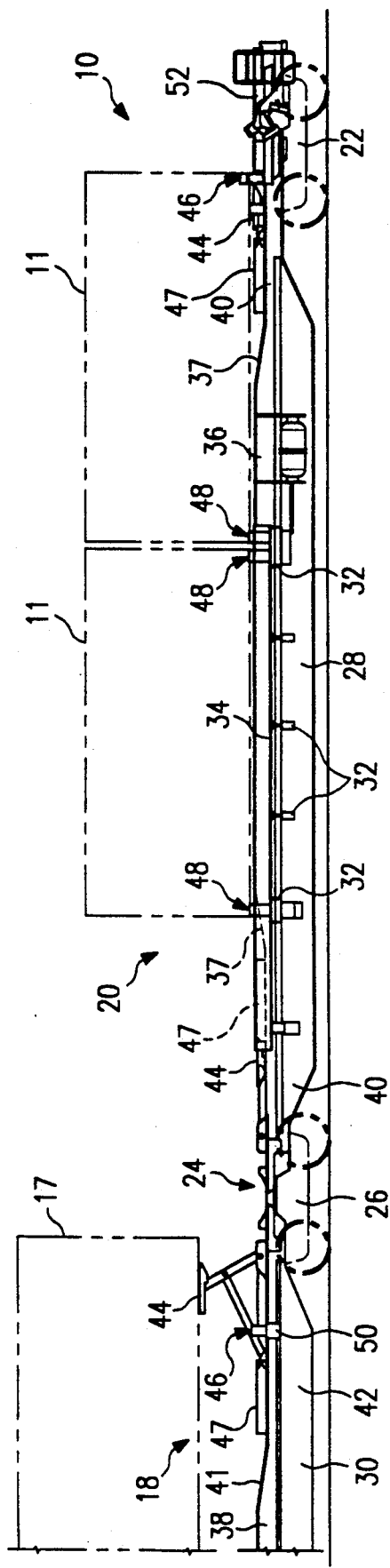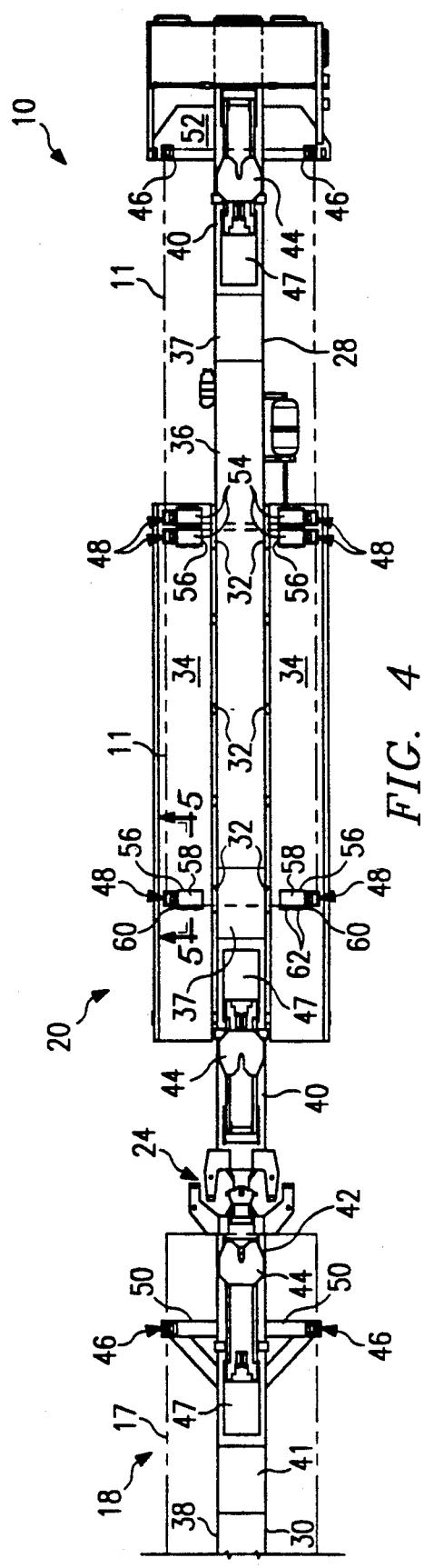

RAILWAY SPINE CAR

TECHNICAL FIELD OF THE INVENTION

The present invention generally relates to railway cars, and more particularly, is concerned with an improved articulated railway spine car for carrying highway truck trailers and/or containers, and with apparatus for securing containers and trailers thereon.

BACKGROUND OF THE INVENTION

Articulated railway cars designed for carrying highway truck trailers and/or containers are well known. In the usual arrangement, an articulated car consists of preferably five interconnected car units in which the remote ends of the end units have standard trucks and have standard couplers for coupling with couplers of other cars in a train makeup. The interior ends of the end car units and the other three car units have articulated connections for close coupling to accommodate one truck which spans and supports the ends of two adjacent car units.

Fuel conservation and environmental concerns require that these railway cars be designed with minimum weight but without sacrificing structural strength and stability for carrying fully loaded containers and/or truck trailers. In order to reduce car weight, manufacturers of some cars have eliminated a support structure for preventing container lading from falling to the tracks in the event of a container floor failure. The lack of such a support structure is highly undesirable.

Manufacturers have also reduced car weight by reducing the height, depth and web and flange thicknesses of structural members such as the center sill and crossbearers. This size downgrading of structural members has the adverse effect, however, of increasing axial and bending stresses in, and deflection of, load bearing structural members, particularly when a car unit is loaded with two containers or trailers end-to-end. This type of loading subjects the center sill member to a very high bending moment at its center, and the sill member must be increased in size or carefully designed and constructed to avoid undue deflection of the center sill.

Dual purpose cars designed for carrying both containers and highway truck trailers typically have wheel pans or decks for supporting the wheels of a trailer, and container brackets, mounts or locks for securing the lower edges of containers. At least two of the container locks are typically located on or adjacent to the wheel pans of the car. In order to prevent interference between the container locks and the wheels of a trailer, it is known in the prior art to use pivotable or stowable container locks on the wheel pans. When not in use, pivotally supported locks can be rotated to a stowed position below the wheel deck surface. For example, see the pivotally mounted container locks disclosed by Hesch, et al., in U.S. Pat. No. 5,052,868, issued Oct. 1, 1991, and entitled "All Purpose Car."

Although useful in preventing interference with the wheels of a trailer on the wheel pans, pivotable container locks of the prior art suffer from an inherent disadvantage. This is the tendency of a lock, when erected for receiving a container, to be inadvertently moved into a horizontal or stowed position before a container can be installed on it. Once a container is installed on the lock, the container holds the lock in the upright position. However, prior to loading the container, the upright lock is not positively retained in loading position and can be inadvertently moved to the stowed position when engaged in the wrong direction, such as by the container.

Prior dual purpose articulated cars also have limited capacity for carrying the longer highway truck trailers that are increasingly being used by transporters. Trailers longer than 48 feet cannot be carried on existing car units without sacrificing carrying space on an adjacent car unit.

Consequently, a need exists for a lightweight railway car for transporting containers and/or highway truck trailers with improved structural resistance to deflection when carrying fully loaded trailers or containers end-to-end, and which provides back-up support for container floors which occasionally rupture from the weight of the container lading. A need also exists for an articulated railway car with car units that can each accommodate highway truck trailers up to 57 feet in length without loss of carrying capacity on adjacent car units. A further need exists for a means for securing stowable container locks in their upright position prior to and during the loading of a container thereon.

SUMMARY OF THE INVENTION

In an articulated railway spine car unit for transporting highway truck trailers and containers and having at least one retractable trailer hitch, an improved center sill extending substantially the entire length of the car unit, and having end portions with upper surfaces depressed with respect to the upper surface of a longitudinally extended center portion, the end portions of the center sill being depressed for receiving the trailer hitch when attached thereto and folded beneath a container mounted on the car unit. A longitudinally extended center portion of the center sill has an upper surface raised with respect to the upper surfaces of its end portions for providing back-up support for the floors of containers when transported thereon, and for providing increased strength and resistance to deflection of the center sill when multiple containers are transported thereon.

In an articulated railway spine car unit for transporting highway truck trailers and containers, an improved pivotable container lock for securing containers thereon, said lock being pivotal between an upstanding position for mounting a container thereon, and a horizontal position for stowing said lock when no container is mounted thereon. A cover is located adjacent to the lock and pivotally attached to the car unit at one side. The cover, in one position covers the stowed container lock, and in another position engages the erected container lock to prevent movement of the lock to the stowed position.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a side elevational view of the articulated spine car of this invention having five car units, showing how an assortment of different length trailers and containers might be transported thereon;

FIG. 2 is a plan view of the spine car of FIG. 1;

FIG. 3 is an enlarged side elevational view of an end car unit and a fragmentary elevational view of an adjacent intermediate car unit;

FIG. 4 is a plan view of the car units of FIG. 3;

FIG. 5 is an enlarged front elevational view of a container lock and lock cover on a car unit, taken along line 5—5 of FIG. 4, with the container lock in the horizontal, stowed position;

FIG. 6 is a front elevational view of the container lock and lock cover of FIG. 5 with the lock secured in the erect position; and FIG. 7 is a front elevational view of the container lock cover in the raised, upright position, showing the attachment of the hinge pin to the trailer wheel pan.

DETAILED DESCRIPTION OF THE INVENTION

The preferred embodiment of the present invention and its advantages are best understood by referring to the drawings, like numerals being used for like and corresponding parts of the various drawings.

In FIGS. 1 and 2 there is shown an articulated railway spine car 10 made up of five car units which embodies the present invention. Also shown in FIG. 1 are an assortment of various length containers 11 and 13 and trailers 15 and 17 which might be carried on the car. The car 10 is made up of end car units 12 and 20 and intermediate car units 14, 16 and 18. The end units 12 and 20 are functionally and structurally identical, and the intermediate units 14, 16, and 18 are functionally and structurally identical. The remote ends of the end car units 12 and 20 have standard trucks 22 and have standard couplers (not shown) for coupling with couplers of other cars in a typical train makeup. The interior ends of the end car units 12 and 20 and each end of the intermediate car units 14, 16, 18 have articulated connections 24 for close coupling to one another, and accommodate a truck 26 which spans and supports the ends of the two adjacent car units. The primary load-bearing member of each car unit is a center sill 28 (end car units 12 and 20) or 30 (intermediate car units 14, 16, 18) which extends the full length of the car unit, and supports cross braces 32, which in turn support trailer wheel pans or decks 34. The center sill 28 or 30 also supports near one of its ends a container bearing cross member, which in the case of an intermediate car unit 14, 16, or 18, is a cross bearer 50, and in the case of an end car unit 12 or 20 is a body bolster 52. FIGS. 3 and 4 illustrate end car unit 20 and a portion of adjoining intermediate car unit 18 in greater detail.

As seen in more detail in FIGS. 3 and 4, each center sill 28 or 30 has a longitudinally extended center portion 36 or 38, respectively, with an upper surface raised or elevated with respect to the upper surfaces of its end portions 40 or 42, respectively. Center sill center portions 36 or 38 are connected to end portion 40 or 42, respectively, by transition portions 37 or 41, respectively. The transition portions 37 and 41 are preferably sloping, as shown, from the top surfaces of the center portions 36 and 38 to the top surfaces of the end portions 40 and 42, respectively.

Installed on the end portions 40 and 42 of the car units is a retractable or collapsible fifth wheel or trailer hitch 44. The hitches 44 can be erected, as illustrated on car units 16 and 18, for receiving a king pin (not shown) on the front end of a highway truck trailer. The hitches are retractable to a flat, collapsed position, as illustrated on car units 12 and 14 in FIG. 1, and on car unit 20 in FIG. 3, for providing the needed clearance for mounting a container on the container locks 46 or 48. The retractable trailer hitches 44 are well known in the railway car art, as disclosed by Hesch, et al. in U.S. Pat. No. 5,052,868.

As discussed above, the upper surfaces of end portions 40 and 42 of center sills 28 and 30, respectively, are depressed with respect to the upper surfaces of their center portions 36 and 38, respectively. The amount of this depression is such that, when trailer hitch 44 is retracted to its collapsed position on the center sill end portion 40 or 42, the upper surfaces of hitch 44 and its supporting members do not extend above the upper surface of the center sill center portion 36 or 38. Thus, when the trailer hitches 44 on a car unit are retracted, the hitch 44 together with the center sill center portions 36 or 38 present an extended, substantially flat, rigid supporting surface in a generally uniform plane providing back-up support for the floors of containers 11 or 13 mounted on the car unit, as illustrated on car units 12 and 14 of FIG. 1, and in more detail on car unit 20 in FIG. 3. The raised center sill center portion 36 or 38 also increases the structural rigidity and resistance to bending deflection of the center sill 28 or 30 when the car unit is transporting end-to-end truck trailers 17 or containers 11.

Referring again to FIG. 4, cover plates 47 overlie a portion of collapsed hitches 44, further increasing the support for the container bottoms. The tops of the plates 47 are also located no higher than the top surfaces of the center sills 36 and 38.

As seen in FIGS. 1 and 2, and more clearly in FIGS. 3 and 4, fixed container securing means or locks 46 are installed on cross bearers 50 on intermediate car units 14, 16, and 18, and on body bolsters 52 on end car units 12 and 20. Pivotable, stowable container securing means or locks 48 are installed on at least one of the cross braces 32, and extend through wheel pans or decks 34 of each car unit. It will be noted that end car units 12 and 20, unlike intermediate car units 14, 16, and 18, have two closely spaced pairs of pivotable container locks 48 extending through the wheel decks 34 near the center of the car units. The additional container locks 48 are located on the end car units 12 and 20 to enable these end car units to carry two containers 11 end-to-end. Only the end car units 12 and 20, which are supported at one end by a standard truck 22, are designed to carry the additional weight loading imposed by two end-to-end containers 11.

As best illustrated in FIGS. 5 and 6, pivotable container locks 48 pivot between an upstanding position extending above wheel deck 34 for mounting a container 11 or 13 thereon, and a horizontal position recessed below wheel deck 34 for stowing the locks when not in use. The container locks 48 are stowed below the surface of wheel deck 34 to permit clearance for the wheels of a trailer 15 or 17 on deck 34.

Also shown in FIGS. 5, 6 and 7 is a container lock cover 54 (typical for all pivotable container locks) which serves two purposes. Referring to FIG. 5, when a container lock 48 is pivoted into its horizontal, stowed position, cover 54 substantially covers the opening 56 in wheel deck 34 which receives the stowed container lock 48. When thus used, cover 54 provides a substantially continuous surface for the deck 34 and prevents a trailer wheel from becoming lodged in opening 56 through which the lock 48 extends when erected. Referring to FIGS. 4 and 6, when the container lock 48 is rotated into its upright position for receiving a container, cover 54 secures lock 48 in the upright position, and prevents lock 48 from inadvertently being moved into the stowed position prior to or during the loading of a container thereon. When thus used, an end 58 of cover 54 abuts the side of the lock 48 and thus prevents lock 48 from rotating to the horizontal position.

As best seen in FIG. 7, the pivoted side of the cover 54 has tubular portions 62 for receiving a hinge pin 60 which is attached to wheel deck 34, preferably by welding. The cover 54 thus pivots about hinge pin 60, and is rotated to an inclined or vertical position, as indicated in FIG. 6, when container lock 48 is to be either stowed or erected. Cover 54 also has near its free edge a hole 64 sized to facilitate lifting cover 54 from its horizontal position.

The railway car of the present invention, and many of its intended advantages, will be understood from the foregoing description and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

I claim:

1. A railway car unit for carrying containers and highway truck trailers, said car unit comprising:
    a center sill extending substantially the entire length of said car unit, said center sill having a longitudinally extended center portion, end portions, and transition portions interconnecting said center portion to said end portions, said center portion having an upper surface elevated with respect to the upper surfaces of said end portions;
    a collapsible and erectable trailer hitch located on the upper surface of at least one of said end portions of said center sill, said trailer hitch having an upper load-bearing surface being substantially level with respect to said upper surface of said center sill center portion when said trailer hitch is collapsed;
    container bearing cross members extending transversely from opposite sides of said center sill;
    cross braces extending transversely from opposite sides of said center sill;
    container securing means supported by at least one of said cross braces and container bearing cross members, and said container securing means being rotatable between a horizontal stowed position and an upright locking position;
    a cover located adjacent to each said container securing means and pivotally attached to said car unit, said cover being adapted for movement between a horizontal position and a vertical position; and
    said container securing means cover, in said horizontal position, substantially overlying said horizontally stowed container securing means, and said cover, in said vertical position, for allowing said container securing means to be positioned for mounting a container thereon, and said cover being repositioned in said horizontal position for securely engaging said container securing means in said upright locking position, and effectively preventing said container securing means from rotating to said horizontally stowed position.

2. The railway car unit of claim 1, wherein said center sill transition portions have upper surfaces sloping downwardly from said center sill center portion to said end portions.

3. The railway car unit of claim 1, wherein said container securing means consists of upstanding container locks affixed to said car unit.

4. The railway car unit of claim 3, wherein at least one of said container locks is pivotable near its lower end for movement between an upstanding position on said car unit when a container is mounted thereon, and a horizontal, stowed position when no container is mounted thereon.

5. The railway car unit of claim 1, wherein said cover is pivotally attached to said car by a hinge secured to said cover and to said car unit structure.

6. The railway car unit of claim 1, wherein said cover has a hole extending therethrough for lifting said cover from its horizontal position.

* * * * *